US010177927B2

(12) United States Patent
Kim et al.

(10) Patent No.: US 10,177,927 B2
(45) Date of Patent: Jan. 8, 2019

(54) PORTABLE TERMINAL AND METHOD FOR CONTROLLING EXTERNAL APPARATUS THEREOF

(71) Applicant: Samsung Electronics Co., Ltd., Suwon-si, Gyeonggi-do (KR)

(72) Inventors: Jee-hyeok Kim, Incheon (KR); Young-jin Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 712 days.

(21) Appl. No.: 14/326,945

(22) Filed: Jul. 9, 2014

(65) Prior Publication Data

US 2015/0026599 A1 Jan. 22, 2015

(30) Foreign Application Priority Data

Jul. 16, 2013 (KR) .................. 10-2013-0083285

(51) Int. Cl.
| | |
|---|---|
| *G06F 3/0481* | (2013.01) |
| *H04L 12/18* | (2006.01) |
| *G06F 17/30* | (2006.01) |
| *H04M 1/725* | (2006.01) |

(52) U.S. Cl.
CPC ........ *H04L 12/1836* (2013.01); *G06F 3/0481* (2013.01); *G06F 17/30* (2013.01); *H04L 12/1822* (2013.01); *H04L 12/1827* (2013.01); *H04M 1/72552* (2013.01)

(58) Field of Classification Search
CPC .... G06F 3/0481; G06F 3/0482; G06F 3/0484; G06F 3/017; G06F 17/30; G06F 13/00; H04L 12/1813; H04N 7/173; H04N 1/173; H04M 1/00
See application file for complete search history.

(56) References Cited

U.S. PATENT DOCUMENTS

| | | | |
|---|---|---|---|
| 7,526,252 B2 | 4/2009 | Rekimoto et al. | |
| 8,639,214 B1* | 1/2014 | Fujisaki | G06Q 20/32 379/88.03 |
| 2002/0144273 A1* | 10/2002 | Reto | H04L 29/06027 725/86 |
| 2003/0154250 A1* | 8/2003 | Miyashita | H04L 29/06 709/204 |
| 2004/0001480 A1* | 1/2004 | Tanigawa | H04L 12/1827 370/352 |
| 2006/0258289 A1* | 11/2006 | Dua | G06F 17/30058 455/41.3 |

(Continued)

FOREIGN PATENT DOCUMENTS

JP 3870882 B2 10/2006

*Primary Examiner* — Steven Sax
(74) *Attorney, Agent, or Firm* — Jefferson IP Law, LLP

(57) ABSTRACT

A portable terminal and a method for controlling an external apparatus thereof are provided. The method for controlling an external apparatus of a portable terminal according to an embodiment of the present disclosure includes display, when an application to perform chatting with a user of another portable terminal is executed, a chatting screen including at least one icon corresponding to an external apparatus, obtaining, when one of the at least one icon is selected, information regarding an external apparatus corresponding to the selected one icon, and transmitting the information regarding the external apparatus to the other portable terminal.

17 Claims, 9 Drawing Sheets

(56) References Cited

U.S. PATENT DOCUMENTS

| | | | | |
|---|---|---|---|---|
| 2007/0288627 | A1* | 12/2007 | Abella | H04N 21/64322 709/224 |
| 2009/0298535 | A1* | 12/2009 | Klein | H04N 21/43615 455/556.1 |
| 2009/0319672 | A1* | 12/2009 | Reisman | G06F 17/30873 709/227 |
| 2010/0218228 | A1* | 8/2010 | Walter | G06F 17/30259 725/105 |
| 2011/0167355 | A1* | 7/2011 | Shelansky | G06F 21/41 715/750 |
| 2011/0185437 | A1* | 7/2011 | Tran | H04L 63/104 726/28 |
| 2012/0278408 | A1* | 11/2012 | Seferian | G06Q 10/1095 709/206 |
| 2013/0054700 | A1* | 2/2013 | Allibhoy | G06Q 10/10 709/204 |
| 2013/0073293 | A1* | 3/2013 | Jang | G10L 15/22 704/275 |
| 2013/0097516 | A1* | 4/2013 | Hong | H04L 67/306 715/739 |
| 2013/0217330 | A1* | 8/2013 | Gardenfors | H04M 1/7253 455/41.2 |
| 2013/0219288 | A1* | 8/2013 | Rosenberg | H04M 3/54 715/748 |
| 2013/0278484 | A1* | 10/2013 | Hwang | G06F 3/1423 345/2.3 |
| 2013/0332326 | A1* | 12/2013 | Archard | G06Q 40/06 705/37 |
| 2014/0006293 | A1* | 1/2014 | Chang | G06Q 30/0202 705/304 |
| 2014/0184732 | A1* | 7/2014 | Dasgupta | H04N 7/148 348/14.09 |
| 2014/0211099 | A1* | 7/2014 | Saha | G05B 1/01 348/734 |
| 2015/0046945 | A1* | 2/2015 | Zhang | H04M 1/72519 725/37 |
| 2015/0195474 | A1* | 7/2015 | Lu | G08C 17/02 348/552 |
| 2015/0365497 | A1* | 12/2015 | Zhao | H04L 67/34 709/220 |
| 2016/0192010 | A1* | 6/2016 | Zaccone | H04N 21/4788 725/116 |

* cited by examiner

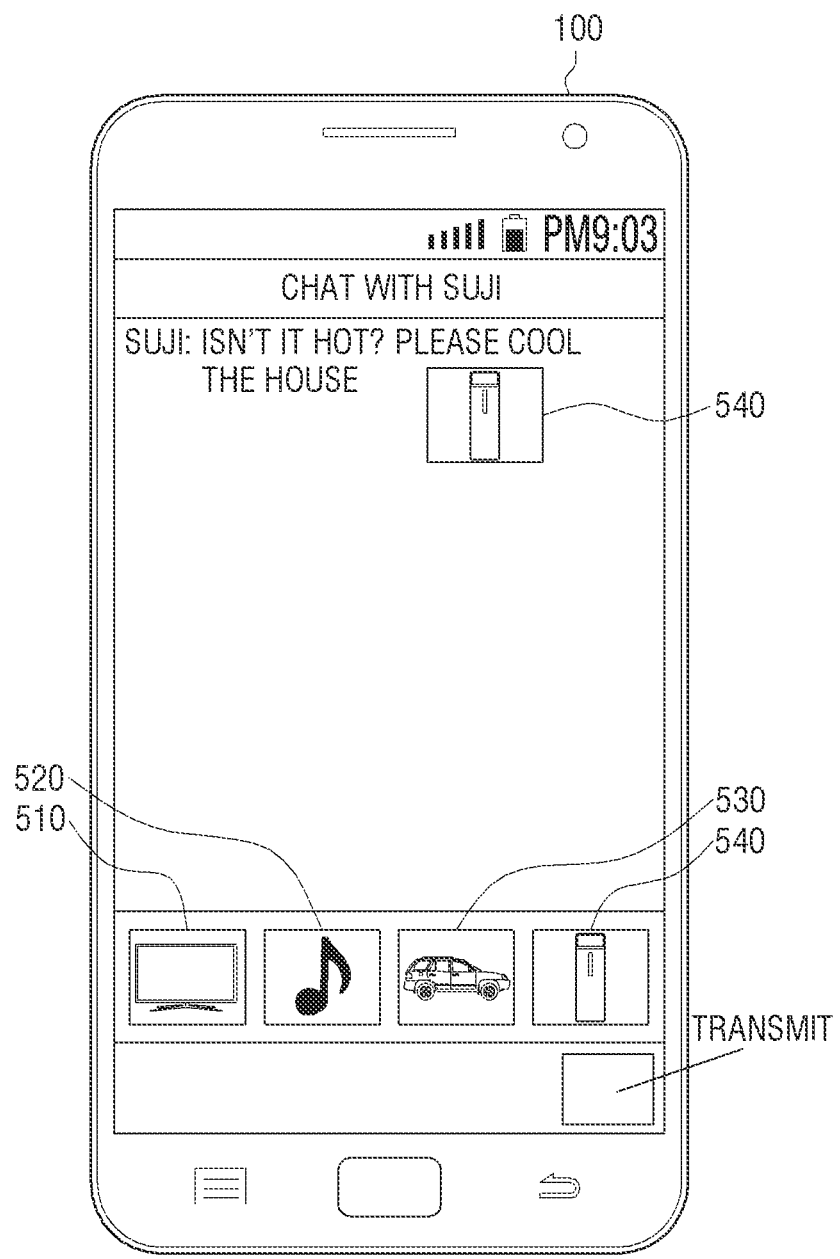

PORTABLE TERMINAL AND METHOD FOR CONTROLLING EXTERNAL APPARATUS THEREOF

CROSS-REFERENCE TO RELATED APPLICATION(S)

This application claims the benefit under 35 U.S.C. § 119(a) of a Korean patent application filed on Jul. 16, 2013 in the Korean Intellectual Property Office and assigned Serial number 10-2013-0083285, the entire disclosure of which is hereby incorporated by reference.

TECHNICAL FIELD

The present disclosure relates to a portable terminal and a method for controlling an external apparatus thereof. More particularly, the present disclosure relates to a portable terminal which allows another portable terminal to control an external apparatus and a method for controlling an external apparatus thereof.

BACKGROUND

Many people wish to share their everyday lives with others through a messenger program, such as a real-time chatting service.

In particular, a recent messenger program allows people to share information through text information, to share contents by exchanging files directly, or to share a web page using Uniform Resource Locator (URL) information, and the like. In addition, users may share contents of games by transmitting a game invitation message using a messenger program. That is, recent messenger programs allow users to share various contents and services.

However, conventional messenger programs allow users to share contents or information only within a portable terminal, and do not allow sharing of a service through an external apparatus (for example, a television).

Accordingly, a chatting service for sharing the same contents with the user of another portable terminal using an external apparatus, and a method for controlling an external apparatus thereof is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-problems and/or disadvantages and to provide at least the advantages described below. Accordingly, an aspect of the present disclosure is to provide a chatting service for sharing the same contents with the user of another portable terminal using an external apparatus, and a method for controlling an external apparatus thereof.

In accordance with an aspect of the present disclosure, a method for controlling an external apparatus of a portable terminal is provided. The method includes, displaying, when an application to perform chatting with a user of another portable terminal is executed, a chatting screen including at least one icon corresponding to an external apparatus, obtaining, when one of the at least one icon is selected, information regarding an external apparatus corresponding to the selected one icon, and transmitting the information regarding the external apparatus to the other portable terminal.

In accordance with another aspect of the present disclosure, a portable terminal is provided. The portable terminal includes a display, an input unit configured to receive a user command, a communication unit configured to perform communication with outside, and a controller configured to, when an application to perform chatting with a user of another portable terminal is executed, control the display to display a chatting screen including at least one icon corresponding to an external apparatus, and, when a user command to select one of the at least one icon is input through the input unit, control the communication unit to obtain information regarding an external apparatus corresponding to the selected one icon and transmit the information regarding the external apparatus to the other portable terminal, In accordance with another aspect of the present disclosure, a method for controlling an external apparatus of a portable terminal is provided. The method includes, displaying, when an application to perform chatting with a user of another portable terminal is executed, a chatting screen including at least one icon corresponding to an external apparatus, displaying, when information regarding an external apparatus is received from the another portable terminal, an icon corresponding to the received external apparatus on the chatting screen, and transmitting, when an icon corresponding to the received external apparatus is selected, the information regarding the external apparatus and a control command to an external apparatus corresponding to the selected icon.

In accordance with another aspect of the present disclosure, a portable terminal is provided. The portable terminal includes a display, an input unit configured to receive a user command, a communication unit configured to perform communication with outside, and a controller configured to, when an application to perform chatting with a user of another portable terminal is executed, control the display to display a chatting screen including at least one icon corresponding to an external apparatus, when information regarding an external apparatus is received from the another portable terminal, control the display to display an icon corresponding to the received external apparatus on the chatting screen, and, when an icon corresponding to the received external apparatus is selected through the input unit, control the controller to transmit the information regarding the external apparatus and a control command to an external apparatus corresponding to the selected icon.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, and 5 are views illustrating a chatting screen of a portable terminal according to an embodiment of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinarily skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
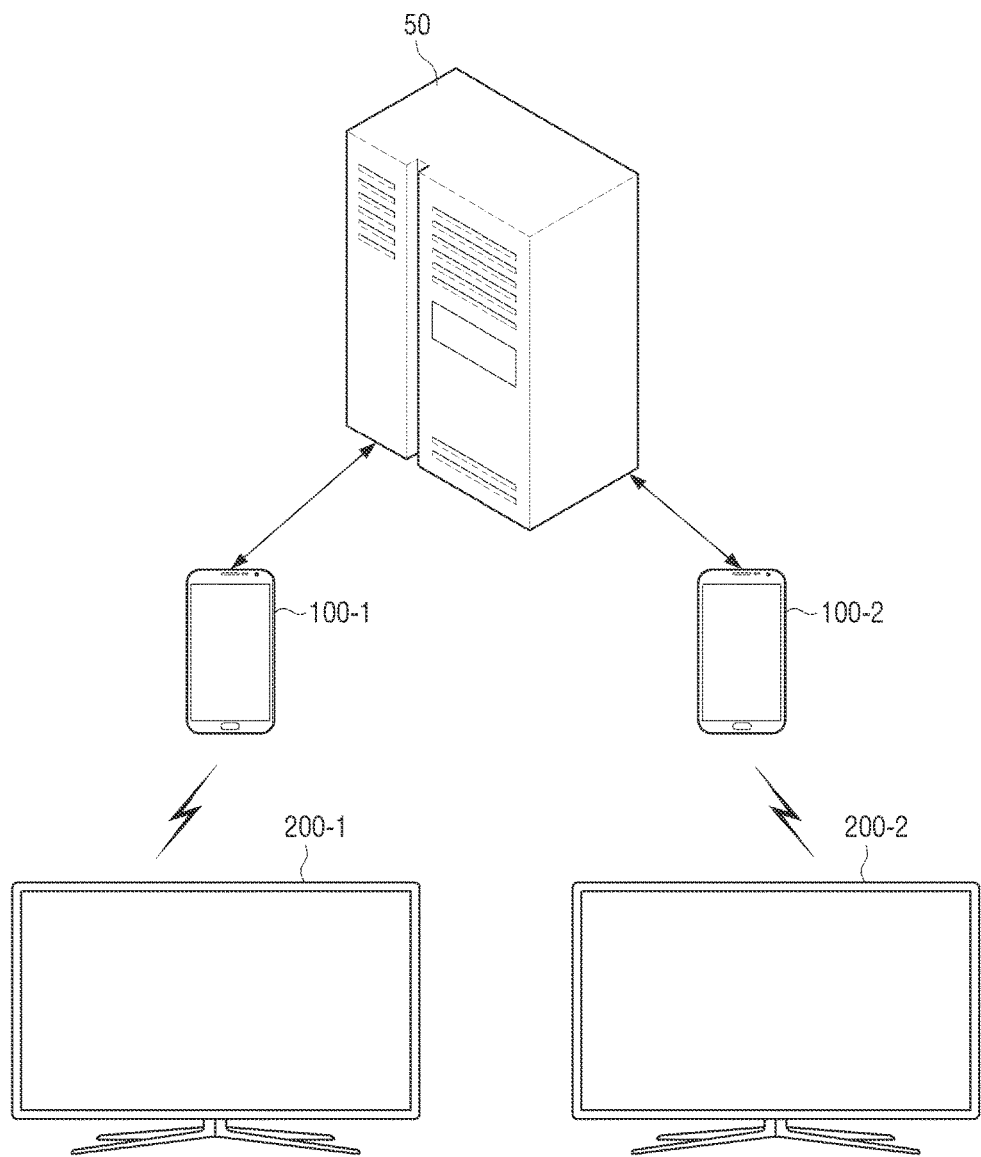
FIG. 1 is a view illustrating configuration of a text transmission system according to an embodiment of the present disclosure.

FIG. 1 is a view illustrating configuration of a text transmission system according to an embodiment of the present disclosure.

As illustrated in FIG. 1, the text transmission system includes a first portable terminal 100-1, a second portable terminal 100-2, a first external apparatus 200-1, a second external apparatus 200-2 which are connected to the first portable 100-1 and the second portable terminal 100-2 respectively, and a server 50 which provides a chatting service between the first portable terminal 100-1 and the second portable terminal 100-2.

The first portable terminal 100-1 and the second portable terminal 100-2 execute an application by a user command. In this case, the application may be a chatting application which may perform a chatting service with a user of another portable terminal.

When a user command to perform chatting with a user of the second portable terminal 100-2 is received from a user of the first portable terminal 100-1, the first portable terminal 100-1 may transmit a chatting request signal to the second portable terminal 100-2 through the service 50.

When a user command to accept the chatting request is input from the user of the second portable terminal 100-2, the second portable terminal 100-2 may transmit a chatting acceptance signal to the first portable terminal 100-1 through the server 50.

When the chatting request is accepted, the server 50 may transmit a list of external apparatuses to be controlled to the first portable terminal 100-1 and the second portable terminal 100-2, respectively. Specifically, the server 50 may transmit a list of external apparatuses which may be controlled by the second portable terminal 100-2 to the first portable terminal 100-1, and transmit a list of external apparatuses which may be controlled by the first portable terminal 100-1 to the second portable terminal 100-2.

The portable terminals 100-1, 100-2 may display a chatting screen. In this case, the chatting screen may include one or more icons corresponding to external apparatuses which may be controlled by both the first portable terminal 100-1 and the second portable terminal 100-2.

If one of the at least one external apparatus is selected by the user of the first portable terminal 100-1, the first portable terminal 100-1 may request information regarding the first external apparatus 200-1 from the first external apparatus 200-1. In response to the request, the first external apparatus 200-1 may transmit information regarding the first external apparatus 200-1. In this case, the information regarding the first external apparatus 200-1 may be information regarding the functions which are currently performed by the first external apparatus 200-1. For example, if the first external apparatus 200-1 is a television, the information regarding the first external apparatus 200-1 may be information on channel which is currently displayed.

In addition, the first portable terminal 100-1 may transmit the information regarding the first external apparatus 200-1 which is received from the first external apparatus 200-1 to the second portable terminal 100-2.

The second portable terminal 100-2 may display an icon corresponding to the received first external apparatus 200-1, and if the icon corresponding to the first external apparatus 200-1 is selected by a user, the second portable terminal 100-2 may transmit information regarding the first external apparatus 200-1 and a control command to the second external apparatus 200-2 which is the same type of external apparatus as the first external apparatus 200-1.

In addition, the second external apparatus 200-2 may perform a function corresponding to the information regarding the first external apparatus 200-1 according to the control command. For example, if the information regarding the first external apparatus 200-1 is channel information, the second external apparatus 200 may select a channel based on the channel information included in the information regarding the first external apparatus 200-1.

As described above, the text transmission system allows users who use a chatting program to enjoy the same contents using an external apparatus and thus, the users may easily share their experiences.

Hereinafter, the present disclosure will be described in detail with reference to FIGS. 2 to 5.

Figure 2:
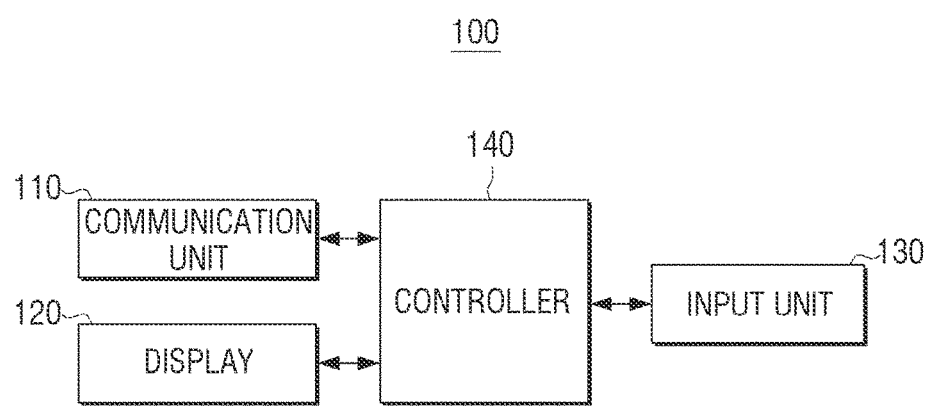
FIG. 2 is a block diagram illustrating configuration of a portable terminal briefly according to an embodiment of the present disclosure.

FIG. 2 is a block diagram illustrating configuration of a portable terminal according to an embodiment of the present disclosure.

Referring to FIG. 2, a portable terminal 100 includes a communication unit 110, a display 120, an input unit 130, and a controller 140, but is not limited thereto.

The communication unit 110 performs communication with an external apparatus or a server. In particular, the communication unit 110 may perform communication with another portable terminal through the server 50. Specifically, the communication unit 110 may perform communication with another portable terminal through the server 50 in order to perform a chatting service through a chatting program.

In addition, the communication unit 110 may perform communication with the external apparatus 200. In this case, the communication unit 110 may obtain information regarding the external apparatus 200, and may transmit information regarding the external apparatus 200 which is received from another portable terminal to control the external apparatus 200 and a control command.

The display 120 may control the portable terminal 100 under the control of the controller 140. In particular, the display 120 may display a chatting screen for performing a chatting service with a user of another portable terminal. In this case, the chatting screen may include at least one or more icon corresponding to an external apparatus.

The input unit 130 may receive a user command to control the portable terminal 100. In particular, the input unit 130 may receive a user command to select one of at least one icon corresponding to an external apparatus. In addition, the input unit 130 may receive a user command to select an icon displayed on a chatting screen.

The controller 140 may control overall operations of the portable terminal 100 according to a user command input in to the input unit 130. In particular, if an application to perform chatting with a user of another portable terminal is executed, the controller 140 may control a display in order to display a chatting screen including at least one icon corresponding to an external apparatus.

Specifically, if an application to perform chatting with a user of another portable terminal is executed, the controller 140 may control the communication unit 110 to receive a list of external apparatuses which may be controlled by another portable terminal from another portable terminal. In this case, the controller 140 may control the communication unit 110 in order to receive a list of external apparatuses which may be controlled by another portable terminal by relaying through the server 50. The controller 140 may determine external apparatuses which may be controlled by both another portable terminal and the portable terminal 100 using the list of external apparatuses received from another portable terminal. In addition, the controller 140 may control the display 120 to display an icon corresponding to an external apparatus which is determined to be controlled by both another portable terminal and the portable terminal 100 on a chatting screen. In this case, if there is an external apparatus which may be controlled by another portable terminal but cannot be controlled by the portable terminal 100, the controller 140 may recommend a service regarding an external apparatus which may be controlled by another portable terminal.

If a user command to select one of at least one icon displayed on a chatting screen is input through the input unit 130, the controller 140 may obtain information regarding the external apparatus 200 corresponding to the selected icon, and control the communication unit 110 to transmit information regarding the external apparatus 200 to another portable terminal. Specifically, if a user command to select one of at least one icon is input through the input unit 130, the controller 140 requests information regarding the external apparatus 200 from the external apparatus 200 corresponding to the selected icon. If information regarding the external apparatus 200 is received from the external apparatus, the controller 140 may transmit the information regarding the external apparatus to another portable terminal. In this case, the information regarding the external apparatus 200 may be information regarding a function which is performed by the current external apparatus 200. For example, if the external apparatus 200 is a television, the information regarding the external apparatus 200 may be information regarding a currently-played channel, if the external apparatus 200 is an audio apparatus, the information regarding the external apparatus 200 may be information regarding a currently-played music, and if the external apparatus 200 is an air conditioner, the information regarding the external apparatus 200 may be information regarding a currently-set temperature. Meanwhile, the controller 140 may transmit the information regarding the external apparatus 200 directly to another portable terminal, but this is only an example. The controller 140 may transmit the information regarding the external apparatus 200 to another portable terminal through the server 50.

If information regarding an external apparatus is received from another portable terminal, the controller 140 may control the display 120 to display an icon corresponding to an external apparatus on a chatting screen by analyzing the received information regarding an external apparatus. If an icon corresponding to an external apparatus displayed on the display 120 is selected, the controller 140 may control the communication unit 110 to transmit information regarding an external apparatus received from another portable terminal and a control command to the external apparatus corresponding to the icon. For example, if information regarding an external apparatus received from another portable terminal is channel information of television, the controller 140 may control the communication unit 110 to transmit the channel information of television received from another portable terminal and a channel selection command to the television.

In this case, if communication between the portable terminal and the external apparatus is not enabled, the controller 140 may set communication with the external apparatus by controlling the communication unit 110 to transmit a signal for requesting communication to the external apparatus. Specifically, if information regarding an external apparatus received from another portable terminal is channel information of television and communication between the portable terminal 100 and the television is not enabled, the controller 140 may search whether there is a television nearby based on pre-stored communication information and request communication setting from a searched television.

While communication is performed with users with a plurality of other portable terminals, if a portable terminal cannot control an external apparatus which is controllable by more than a predetermined number of portable terminals from among the plurality of other portable terminals, the controller 140 may recommend a service regarding the external apparatus. For example, while chatting is performed with users of a plurality of other portable terminals, if the portable terminal 100 cannot control an external apparatus which is controllable by more than a half of the plurality of other portable terminals, the controller 140 may recommend a service regarding the corresponding external apparatus to a user.

By using the above-described portable terminal 100, a user may share functions of an external apparatus that the user is currently using with other users. In addition, the user may share functions of an external apparatus which other users are currently using.

Figure 3:
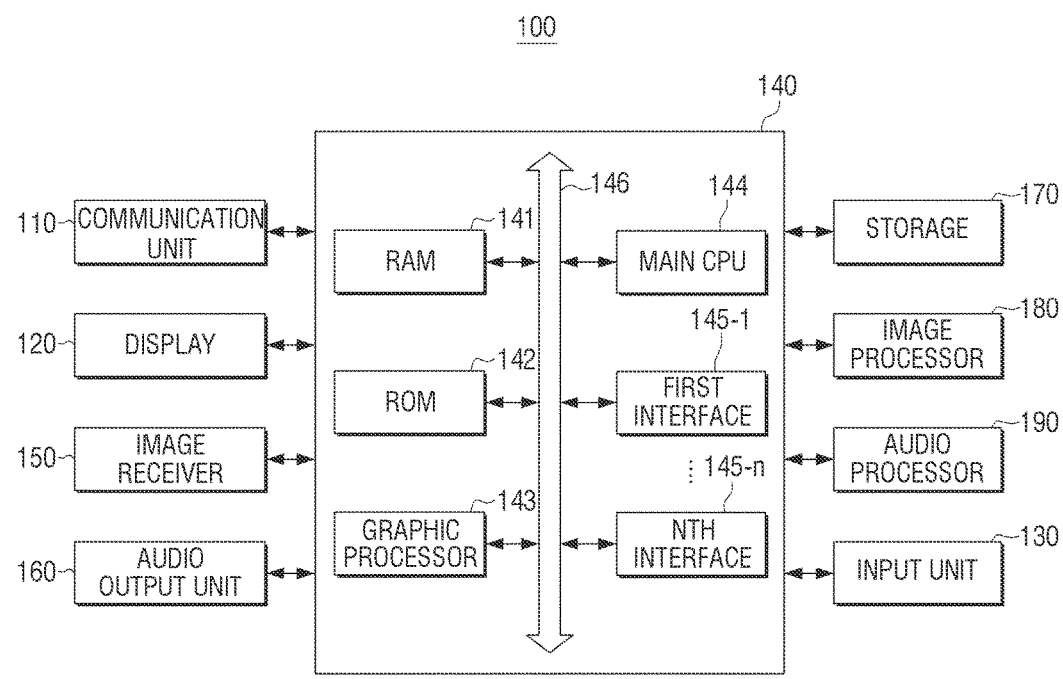
FIG. 3 is a block diagram illustrating configuration of a portable terminal in detail according to an embodiment of the present disclosure.

FIG. 3 is a block diagram illustrating configuration of a portable terminal in detail according to an embodiment of the present disclosure.

Referring to FIG. 3, a portable terminal 100 includes a communication unit 110, a display 120, an image receiver 150, an audio output unit 160, a storage 170, an image processor 180, an audio processor 190, an input unit 130, and a controller 140, but is not limited thereto.

FIG. 3 illustrates various components comprehensively, assuming that the portable terminal 100 is an apparatus having various functions such as a communication function, an external apparatus control function, a display function, but is not limited thereto. Accordingly, depending on various embodiments, a part of the components illustrated in FIG. 3 may be omitted or changed, or other components may be further added.

The communication unit 110 communicates with various types of external apparatuses or an external server according to various types of communication methods. The communication unit 110 may include various communication chips such as a WiFi chip, a Bluetooth chip, a Near Field Communication (NFC) chip, a wireless communication chip, and so on. In this case, the WiFi chip, the Bluetooth chip, and the NFC chip perform communication according to a WiFi method, a Bluetooth method, and an NFC method, respectively. Among the above chips, the NFC chip represents a chip which operates according to an NFC method which uses 13.56 MHz band among various RF-ID frequency bands such as 135 kHz, 13.56 MHz, 433 MHz, 860~960 MHz, 2.45 GHz, and so on. In the case of the WiFi chip or the Bluetooth chip, various connection information such as a SubSystem Identification (SSID) and a session key may be transmitted/received first for communication connection and then, various information may be transmitted/received. The wireless communication chip represents a chip which performs communication according to various communication standards such as IEEE, Zigbee, $3^{rd}$ Generation (3G), $3^{rd}$ Generation Partnership Project (3GPP), Long Term Evolution (LTE) and so on.

In particular, the communication unit 110 may perform communication with other portable terminals through the server 50. Specifically, the communication unit 110 may perform communication with other portable terminals through the server 50 in order to perform a chatting service through a chatting program.

In addition, the communication unit 110 may perform communication with the external apparatus 200. In this case, the communication unit 110 may obtain information regarding the external apparatus 200, and may transmit information regarding the external apparatus 200 received from other portable terminals and a control command in order to control the external apparatus 200.

Figure 4A:
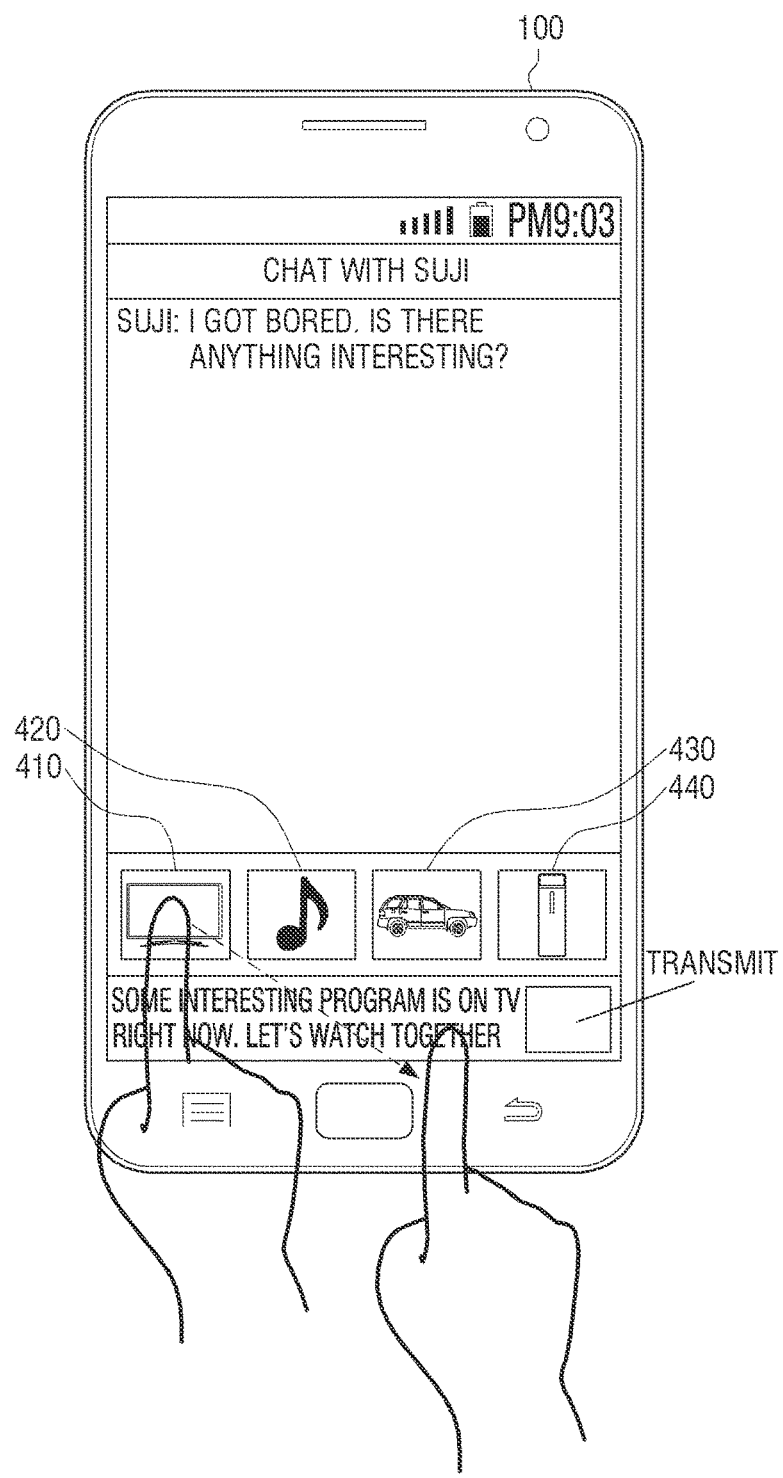

The display 120 displays at least one of a video frame processed by the image processor 180 after receiving image data from the image receiver 150 and various screens generated by the graphic processor 143. In particular, if an application to perform a chatting service is executed, the display 120 may display a chatting screen to perform the chatting service with a user of another portable terminal. In this case, the chatting screen may include a chatting area, an icon area, and a text input area as illustrated in FIG. 4A, and the icon area may include icons 410, 420, 430, and 440 corresponding to a plurality of external apparatuses.

The image receiver 150 receives image data through various sources. For example, the image receiver 150 may receive broadcast data from an external broadcasting station or from an external device (for example, a Digital Video Disk (DVD) apparatus).

The audio output unit 160 outputs not only various pieces of audio data but also various alarm sounds and a voice message, which are processed by the audio processor 180.

The storage 170 stores various modules to drive the portable terminal 100. For example, the storage 170 may store software including a base module, a sensing module, a communication module, a presentation module, a web browser module, and a service module. In this case, the base module refers to a basic module which processes a signal transmitted from each hardware component included in the portable terminal 100, and transmits the processed signal to an upper layer module. The sensing module is a module which collects information from various sensors, and analyzes and manages the collected information. The sensing module may include a face recognition module, a voice recognition module, a motion recognition module, and an NFC recognition module, and the like. The presentation module is a module to compose a display screen. The presentation module includes a multimedia module for reproducing and outputting multimedia contents, and a UI rendering module for UI and graphic processing. The communication module is a module to perform communication with outside. The web browser module refers to a module which accesses a web server by performing web-browsing. The service module is a module including various applications for providing various services.

In particular, the storage 170 may store a chatting program which enables communication with a user of another portable terminal. In this case, the chatting program may include a service manager program to generate a control command to control an external apparatus and a service program to perform communication of each external apparatus.

The image processor 180 is an element which processes image data received from the image receiver 150. The image processor 180 may perform various image processing with respect to image data such as decoding, scaling, noise filtering, frame rate conversion, resolution conversion, and the like.

The audio processor 190 is an element which processes audio data. The audio processor 190 may perform various processing with respect to audio data such as decoding, amplification, noise filtering, and the like. The audio data processed by the audio processor 190 may be output to the audio output unit 160.

The input unit 130 receives a use command to control overall operations of the portable terminal 100. In particular, the input unit 130 may receive a user command to execute an interactive application, a user command to select a service to be performed, and the like.

The input unit 130 may be realized as a touch panel, but this is only an example. The input unit 130 may be realized as various input apparatuses which may control the portable terminal 100, such as a keyboard, a mouse, a remote controller, a pointing device, and the like.

The controller 140 controls overall operations of the portable terminal 100 using various programs stored in the storage 170.

As illustrated in FIG. 3, the controller 140 may include a Random-Access Memory (RAM) 141, a Read-Only Memory (ROM) 142, a graphic processor 143, a main Central Processing Unit (CPU) 144, a first to nth interfaces 145-1~145-n, and a bus 146. In this case, the RAM 141, the ROM 142, the graphic processor 143, the main CPU 144, and the first to nth interfaces 145-1~145-n may be connected to each other through the bus 146.

The ROM 142 stores a set of commands for system booting. If a turn-on command is input and power is supplied, the main CPU 144 copies an Operating System (O/S) stored in the storage 170 onto the RAM 141 according to a command stored in the ROM 142 and boots a system by executing the O/S. If the booting is completed, the main CPU 144 copies various application programs stored in the storage 170 onto the RAM 141 and performs the various operations by executing the application programs copied in the RAM 141.

The graphic processor 143 generates a screen including various objects such as an icon, an image, and a text using a computing unit (not shown) and a rendering unit (not shown). The computing unit computes property values such as coordinates, shape, size, and color of each object to be displayed according to the layout of the screen using a control command received from the input unit 130. The rendering unit generates a screen with various layouts including objects based on the property values computed by the computing unit. The screen generated by the rendering unit is displayed within the display area of the display 120.

The main CPU 144 access the storage 170 and performs booting using an O/S stored in the storage 170, and performs various operations using various programs, contents, and data stored in the storage 170.

The first to nth interfaces 145-1~145-n are connected to the above-described various components. One of the interfaces may be a network interface which is connected to an external apparatus via network.

In particular, if an application to perform chatting with a user of another portable terminal is executed, the controller 140 may control the display 120 to display a chatting screen including at least one icon corresponding to an external apparatus, and if a user command to select one of the at least one icon is input through the input unit 130, the controller 140 may control the communication unit 110 to obtain information regarding an external apparatus corresponding to the selected icon and transmit the information regarding the external apparatus to the communication unit 110.

Specifically, if an application to perform chatting with a user of another portable terminal is executed and a chatting partner is selected, the controller 140 may control the communication unit 110 to receive a list of external apparatuses which may be controlled by the portable terminal of the selected chatting partner from portable terminal of the selected chatting partner through the server 50. For example, the received list of external apparatuses may include "television", "audio apparatus", "game console", "air conditioner", "lighting", and the like.

The controller 140 may determine an external apparatus controllable by both the portable terminal of the selected chatting partner and the portable terminal by comparing the received list of external apparatuses with the list of controllable external apparatuses stored in the portable terminal. For example, if the list of external apparatuses controllable by the portable terminal of the selected chatting partner includes "television", "audio apparatus", "game console", "air conditioner", and "lighting", and the list of controllable external apparatuses stored in the portable terminal 100 includes "television", "audio apparatus", "game console", "air conditioner", and "DVD player", the controller 140 may determine that the external apparatuses controllable by both the portable terminal of the selected chatting partner and the portable terminal are "television", "audio apparatus", "game console", and "air conditioner".

Meanwhile, the controller 140 may control the portable terminal of the chatting partner, but may recommend a service regarding an external apparatus controllable by the portable terminal (for example, "lighting") to a user.

Figure 4B:
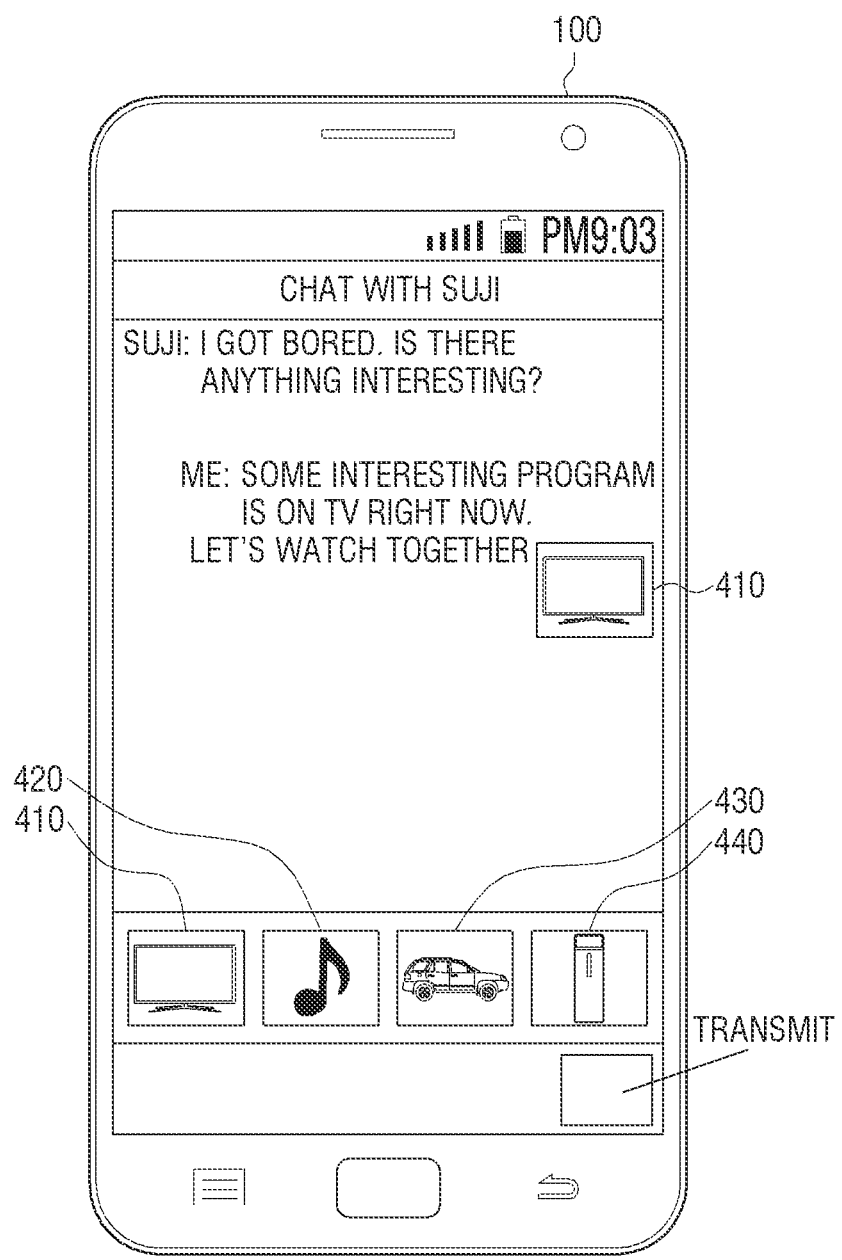

FIGS. 4A, 4B, and 5 are views illustrating a chatting screen of a portable terminal according to an embodiment of the present disclosure.

Referring to FIGS. 4A and 4B, the controller 140 may control the display 110 to display a chatting screen including a plurality of icons corresponding to an external apparatus controllable by both the portable terminal of the selected chatting partner and the portable terminal. In this case, the controller 140, as illustrated in FIG. 4A, may control the display 120 to display a chatting area displaying chatting between a user of the portable terminal 100 and the chatting partner on the upper portion of the chatting screen, to display an icon area displaying icons 410, 420, 430, 440 corresponding to an external apparatus on the middle portion of the chatting screen, and to display a text writing area where the user of the portable terminal 100 to write a text on the lower portion of the chatting screen. In particular, if it is determined that the external apparatuses controllable by both the portable terminal of the selected chatting partner and the portable terminal are "television", "audio apparatus", "game console", and "air conditioner", the controller 140, as illustrated in FIG. 4A, may control the display 120 to display a plurality of icons 410, 420, 430, 440 corresponding to "television", "audio apparatus", "game console", and "air conditioner" on the icon area of the chatting screen.

If one of a plurality of icons is selected while chatting is performed with a chatting partner, the controller 140 may control the communication unit 110 to obtain information regarding an external apparatus corresponding to the selected icon and transmit the obtained information to the portable terminal of the chatting partner. Specifically, while chatting is performed with a chatting partner, as illustrated in FIG. 4A, if a user command to touch an icon 410 corresponding to "television" from among a plurality of icons, drag the icon to a text writing area, and select "transmit" icon is input, the controller 140, as illustrated in FIG. 4B, may control the display 120 to display a text input to the chatting area and the selected icon 410, and control the communication unit to receive "information regarding television" from "television" corresponding to the selected icon 410. In this case, the "information regarding television" may be "information regarding a content (for example, a broadcasting content, and the like) played by the television". In addition, the controller 140 may control the communication unit 110 to transmit the received "information regarding television" to the portable terminal of the chatting partner. In this case, the controller 140 may transmit "information regarding television" directly to the portable terminal of the chatting partner, but this is only an example. The controller 140 may transmit "information regarding television" to the portable terminal of the chatting partner through the server 50 which provides a chatting service.

In the above embodiment, information regarding an external apparatus is "information regarding television", but this is only an example. The technical feature of the present disclosure may be applied to other external apparatuses. For example, "information regarding audio apparatus" may be information regarding a music content currently played by an audio apparatus, "information regarding game console" may be information regarding a game console currently played, and "information regarding air conditioner" may be information on temperature which is set currently.

In addition, while communication is performed with a chatting partner, the controller 140 may control the communication unit 110 to receive information regarding an external apparatus from the portable terminal of the chatting partner. For example, while communication is performed with a chatting partner, the controller 140 may control the communication unit 110 to receive "information regarding air conditioner" from the portable terminal of the chatting partner.

If information regarding an external apparatus is received from the portable terminal of the chatting partner, the controller 140 may control the display 120 to display an icon corresponding to the external apparatus included in the information received from the portable terminal of the chatting partner on a chatting area.

Referring to, FIG. 5, the controller 140 may control the display 120 to display a plurality of icons 510, 520, 530 and 540, including an icon 540 corresponding to an air conditioner on a chatting area.

If an icon displayed on the chatting area is selected, the controller 140 may control the communication unit 110 to transmit information regarding an external apparatus which is received from the portable terminal of the chatting partner and a control command to the external apparatus corresponding to the selected icon. For example, if an icon corresponding to "air conditioner" displayed on the chatting area is touched, the controller 140 may control the communication unit 110 to transmit temperature information received from the portable terminal of the chatting partner and a control command to change the temperature to the air conditioner corresponding to the selected icon.

However, if communication between the portable terminal 100 and the air conditioner is not established, the controller 140 may control the communication unit 110 to set communication with the air conditioner by transmitting a signal to request communication to the air conditioner. After communication with the air conditioner is established, the controller 140 may control the communication unit 110 to transmit the temperature information received from the portable terminal of the chatting partner and a control command to the selected air conditioner.

While chatting is performed with users of a plurality of other portable terminals, if the portable terminal 100 cannot control an external apparatus which is controllable by more than a predetermined number of portable terminals from among the plurality of other portable terminals, the controller 140 may recommend a service regarding the external apparatus which cannot be controlled by the portable terminal. For example, if more than half of a plurality of other portable terminals may control "print" but the portable terminal 100 may not control "print", the controller 140 may recommend a service regarding the print to a user using a pop-up window, and the like.

According to the above-described portable terminal 100, a user may share the functions of an external apparatus which he or she is currently using with chatting partners easily. In addition, the user may easily share the functions of external apparatuses which other chatting partners are using.

Hereinafter, a method for controlling an external apparatus according to various embodiments of the present disclosure will be described with reference to FIGS. 6 to 8.

Figure 6:
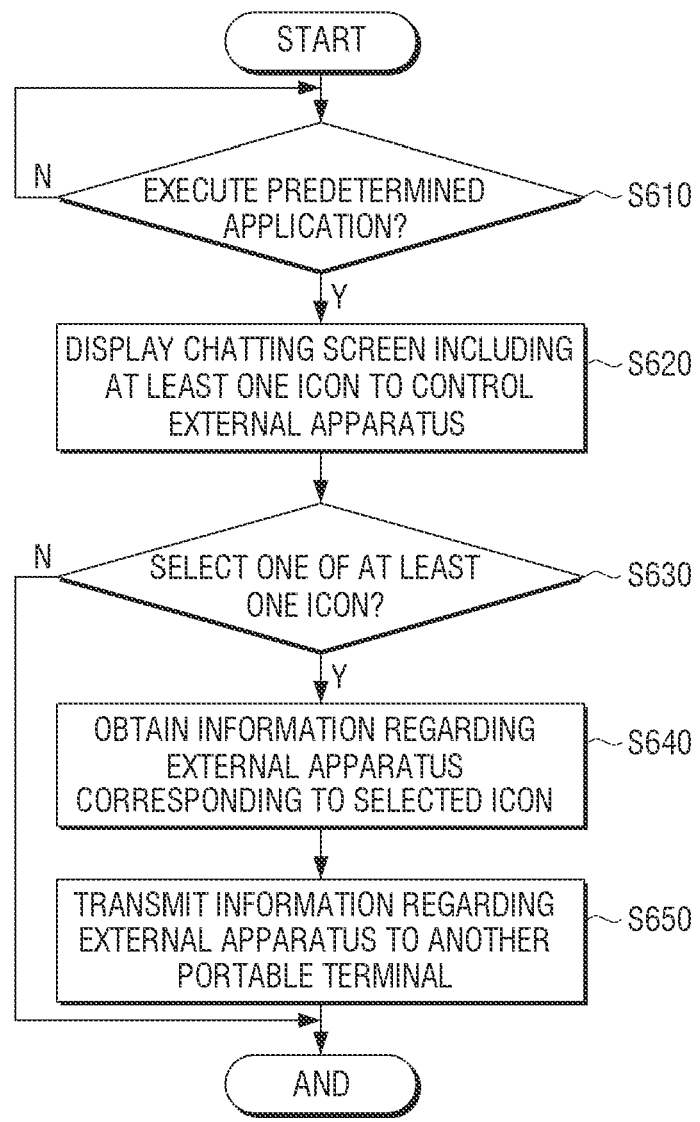
FIGS. 6 and 7 are flowcharts provided to explain a method for controlling an external apparatus of a portable terminal according to various embodiments of the present disclosure.

FIG. 6 is a flowchart provided to explain a method for controlling of an external apparatus by the portable terminal 100 according to an embodiment of the present disclosure.

Referring to FIG. 6, the portable terminal 100 may determine whether an application is executed at operation S610. In this case, the application may perform chatting with other portable terminals.

If the application is executed at operation S610-Y, the portable terminal 100 displays a chatting screen including at least one icon to control the external apparatus 200 at operation S620. Specifically, if the application is executed, the portable terminal 100 may receive a list of external apparatuses controllable by other portable terminals through the server 50, and determine external apparatuses controllable by both the portable terminal and other portable terminals using the list of external apparatuses. The portable terminal 100 may display an icon corresponding to the determined external apparatuses. Otherwise, at operation S610-N, the portable terminal 100 continues to determine whether an application is executed.

Subsequently, the portable terminal 100 determines whether a user command to select one of at least one icon is input at operation S630.

If one of at least one icon is selected at operation S630-Y, the portable terminal 100 obtains information regarding an external apparatus corresponding to the selected icon at operation S640. In this case, the information regarding an external apparatus may be information regarding a function performed by a current external apparatus. For example, if an external apparatus is a television, information regarding the external apparatus may be information on channels currently displayed by the television. Otherwise, at operation S630-N, the portable terminal 100 ends processing.

The portable terminal 100 transmits the information regarding an external apparatus to other portable terminals at operation S650.

Figure 7:
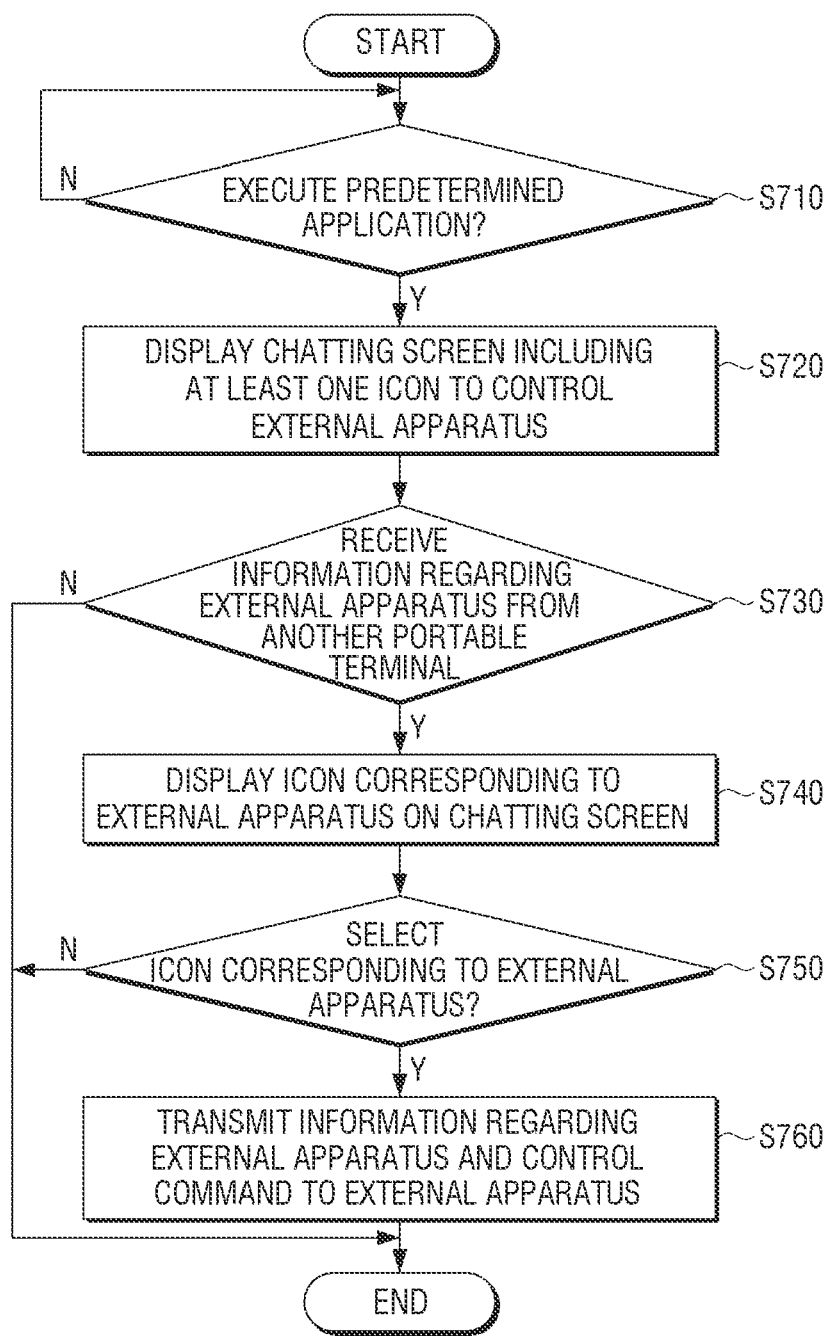

FIG. 7 is a flowchart provided to explain a method for controlling an external apparatus by the portable terminal 100 according to another embodiment of the present disclosure.

Referring to FIG. 7, the portable terminal 100 may determine whether an application is executed at operation S710. In this case, the application may perform chatting with other portable terminals.

If the application is executed at operation S710-Y, the portable terminal 100 displays a chatting screen including at least one icon to control the external apparatus 200 at operation S720. Specifically, as described above, if the application is executed, the portable terminal 100 may receive a list of external apparatuses controllable by other portable terminals through the server 50, and determine control apparatuses controllable by both the portable terminal and other portable terminals using the list of external apparatuses. The portable terminal 100 may display an icon corresponding to the determined external apparatus. Otherwise, at operation S710-N, the portable terminal 100 continues to determine whether an application is executed.

The portable terminal 100 determines whether information regarding an external apparatus is received from other portable terminals at operation S730. In this case, the information regarding an external apparatus may be information regarding the function of an external apparatus which is currently performed by a user.

If the information regarding an external apparatus is received from other portable apparatuses at operation S730-Y, the portable terminal 100 displays an icon corresponding to the external apparatus on a chatting screen at operation S740. Otherwise, at operation S730-N, the portable terminal 100 ends processing.

Subsequently, the portable terminal 100 determines whether the icon corresponding to the external apparatus, displayed on the chatting screen is selected at operation S750. In this case, the icon corresponding to the external apparatus received from other portable terminals may be displayed on an area which is different from the area where the previous at least one icon is displayed.

If the icon corresponding to the external apparatus is selected at operation S750-Y, the portable terminal 100 transmits information regarding the external apparatus and a control command to an external apparatus corresponding to the selected icon at operation S760. Otherwise, at operation S750-N, the portable terminal 100 ends processing.

According to the above-described method for controlling an external apparatus by the portable terminal 100, users who are using a chatting program may enjoy the same contents using an external apparatus and thus, the users may share experiences easily.

Figure 8:
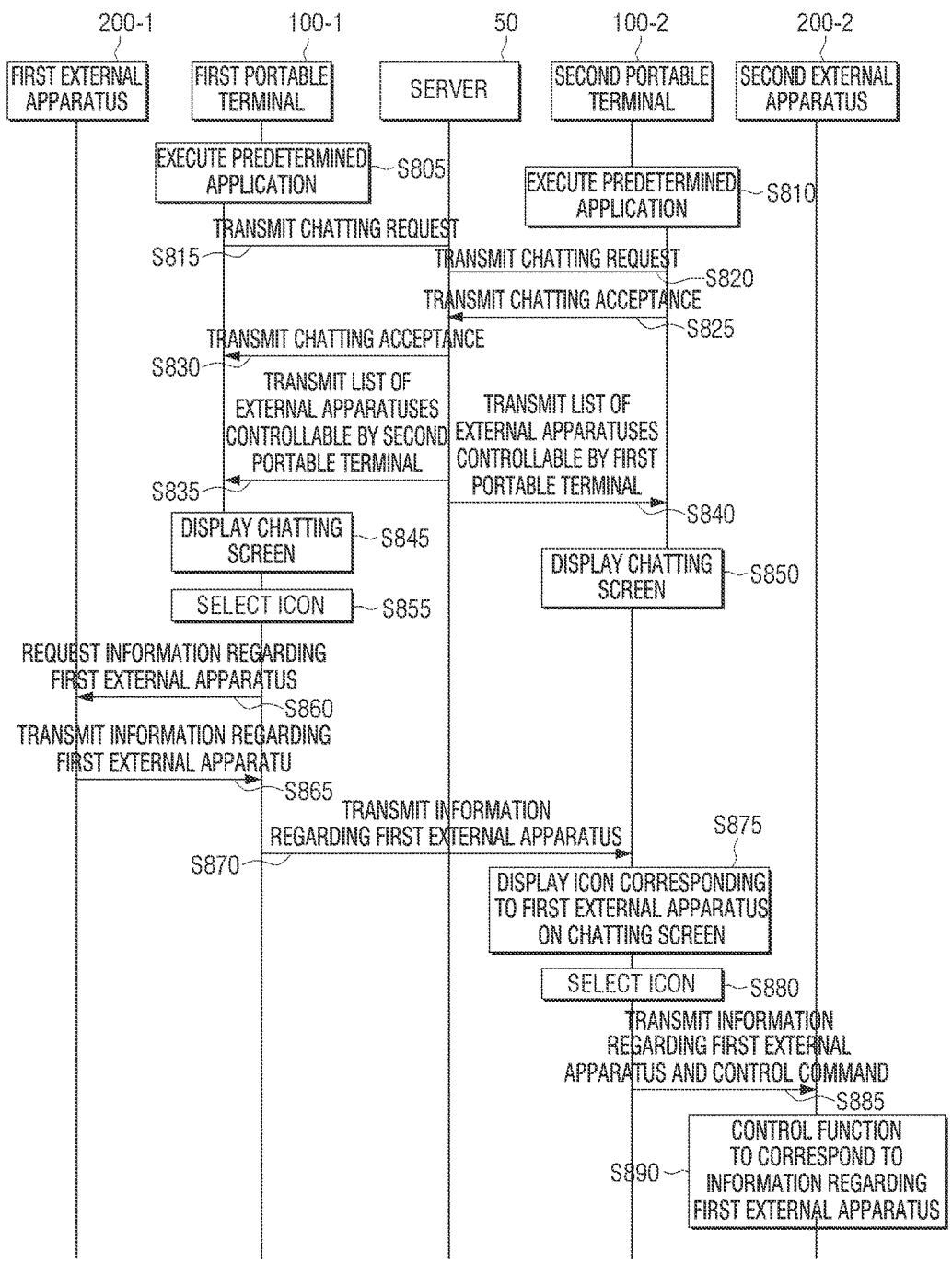
FIG. 8 is a sequence view provided to explain a method for controlling an external apparatus of a text transmission system according to an embodiment of the present disclosure.

FIG. 8 is a sequence view provided to explain a method for controlling an external apparatus of a text transmission system according to an embodiment of the present disclosure.

Referring to FIG. 8, a first portable terminal 100-1 and a second portable terminal 100-2 execute an application at operations S805 and S810. In this case, only one of the first portable terminal 100-1 may be executed, and the other portable terminal may execute an application after a chatting request.

The first portable terminal 100-1 transmits a chatting request signal to request chatting with a user of the second portable terminal 100-2 to the server 50 according to a user command at operation S815. The server 50 transmits the chatting request received from the first portable terminal 100-1 to the second portable terminal 100-2 at operation S820. The second portable terminal 100-2 transmits a chatting acceptance signal to accept chatting with the first portable terminal 100-1 to the server 50 according to a user input at operation S825. The server 50 transmits the chatting acceptance signal received from the second portable terminal 100-2 to the first portable terminal 100-1 at operation S830.

If a chatting service is established between a user of the first portable terminal and a user of the second portable terminal 100-2, the server 50 transmits a list of external apparatuses controllable by the second portable terminal 100-2 to the first portable terminal 100-1 at operation S835 and transmits a list of external apparatuses controllable by the first portable terminal 100-1 to the second portable terminal 100-2 at operation S840.

The first portable terminal 100-1 and the second portable terminal 100-2 display a chatting screen, respectively at operations S845 and S850. In this case, the first portable terminal 100-1 and the second portable terminal 100-2 may display at least one icon corresponding to an external apparatus which is controllable by both the first portable terminal 100-1 and the second portable terminal 100-2 on the chatting screen.

The first portable terminal 100-1 selects one of the at least one icon according to a user input at operation S855.

The first portable terminal 100-1 transmits a signal to request information regarding a first external apparatus to the first external apparatus 200-1 corresponding to the selected icon at operation S860.

The first external apparatus 100-1 transmits information regarding the first external apparatus 200-1 to the first portable terminal 100-1 in response to the request signal at operation S865. In this case, the information regarding the first external apparatus 200-1 may be information regarding a function currently performed by the first external apparatus 200-1.

The first portable terminal 100-1 transmits the information regarding the first external apparatus 200-1 to the second portable terminal 100-2 at operation S870. The second portable terminal 100-2 displays an icon corresponding to the first portable terminal on a chatting screen at operation S875.

The second portable terminal 100-2 selects an icon corresponding to the first external apparatus according to a user command at operation S880. If an icon corresponding to the first external apparatus 200-1 is selected, the second portable terminal 100-2 transmits information regarding the first external apparatus 200-1 and a control command to the second external apparatus 200-2 in the same type as the first external apparatus 200-1 at operation S885.

The second external apparatus 200-2 controls a function to correspond to the information regarding the first external apparatus 200-1 at operation S890.

Accordingly, a user of the first portable terminal 100-1 and a user of the second portable terminal 100-2 may perform the same function through the first external apparatus 200-1 and the second external apparatus 200-2 so that they may share their experiences.

Meanwhile, the method for controlling an external apparatus according to the above-described various embodiments of the present disclosure may be realized as a program and provided in a portable terminal. In addition, a non-transitory computer readable medium storing the program may be provided. The non-transitory recordable medium refers to a medium which may store data semi-permanently rather than storing data for a short time such as a register, a cache, and a memory and may be readable by an apparatus. Specifically, the above-described various applications or programs may be stored in a non-temporal recordable medium such as Compact Disk (CD), DVD, hard disk, Blu-ray disk, Universal Serial Bus (USB), memory card, ROM, and the like, and provided therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an external apparatus by a first portable terminal, the method comprising:
   receiving, from a server when an application to perform chatting with a user of a second portable terminal is executed, a list of external apparatuses controllable by the second portable terminal;
   identifying, from the list of external apparatuses, an external apparatus controllable by both the first portable terminal and the second portable terminal;
   displaying, by the first portable terminal, when the application to perform chatting with the user of the second portable terminal is executed, a chatting screen including a chatting area, a text input area, and at least one icon representing the identified external apparatus;
   selecting one icon of the at least one icon by dragging and dropping the one icon of the at least one icon to the text input area of the chatting screen;
   obtaining, by the first portable terminal, when the one icon of the at least one icon is selected, information regarding an external apparatus corresponding to the selected one icon;
   transmitting, by the first portable terminal, the information regarding the external apparatus and a control command corresponding to the selected icon to the second portable terminal; and
   controlling the external apparatus corresponding to the selected icon in accordance with the control command.

2. The method as claimed in claim 1, further comprising:
recommending, when there is a first external apparatus which is controllable by the second portable terminal but not controllable by the first portable terminal, a service regarding the first external apparatus.

3. The method as claimed in claim 1, further comprising:
displaying, when information regarding a second external apparatus is received from the second portable terminal, an icon corresponding to the second external apparatus on the chatting screen.

4. The method as claimed in claim 3, further comprising:
transmitting, when the icon corresponding to the second external apparatus is selected, the information regarding the second external apparatus received from the second portable terminal and a second control command to the second external apparatus.

5. The method as claimed in claim 4, further comprising:
transmitting, when communication between the first portable terminal and the second external apparatus is not established, a signal to request communication to the second external apparatus.

6. The method as claimed in claim 1, wherein the obtaining information regarding the external apparatus comprises:
obtaining, when the external apparatus corresponding to the selected one icon is a television, information regarding a currently-displayed channel from the television.

7. The method as claimed in claim 1, wherein the displaying comprises:
recommending, while chatting is performed with users of a plurality of other portable terminals and when the first portable terminal does not control a third external apparatus which is controllable by more than a predetermined number of portable terminals from among the plurality of other portable terminals, a service regarding the third external apparatus.

8. A first portable terminal comprising:
a display;
an input device configured to receive a user command;
a transceiver configured to perform communication with outside; and
at least one processor configured to:
control the transceiver, when an application to perform chatting with a user of a second portable terminal is executed, to receive, from a server, a list of external apparatuses controllable by the second portable terminal,
control the display to identify, from the list of external apparatuses, an external apparatus controllable by both the first portable terminal and the second portable terminal,
control the display of the first portable terminal, when the application to perform chatting with the user of the second portable terminal is executed, to display a chatting screen including a chatting area, a text input area, and at least one icon representing the identified external apparatus,
control to receive, via the input device, the user command selecting one icon of the at least one icon by dragging and dropping the one icon of the at least one icon to the text input area of the chatting screen, and
control the transceiver of the first portable terminal, when a user command to select one of the at least one icon is input through the input device, to obtain information regarding the external apparatus corresponding to the selected one icon,
transmit the information regarding the external apparatus and a control command corresponding to the selected icon to the second portable terminal, and
control the external apparatus corresponding to the selected icon in accordance with the control command.

9. The first portable terminal as claimed in claim 8, wherein the at least one processor is further configured to recommend, when there is a first external apparatus which is controllable by the second portable terminal but not controllable by the first portable terminal, a service regarding the first external apparatus.

10. The first portable terminal as claimed in claim 8, wherein the at least one processor is further configured to control the display, when information regarding a second external apparatus is received from the second portable terminal, to display an icon corresponding to the second external apparatus on the chatting screen.

11. The first portable terminal as claimed in claim 10, wherein the at least one processor is further configured to control the transceiver, when the icon corresponding to the second external apparatus is selected, to transmit the information regarding the second external apparatus received from the second portable terminal and a control command to the second external apparatus.

12. The first portable terminal as claimed in claim 11, wherein the at least one processor is further configured to control the transceiver, when communication between the first portable terminal and the second external apparatus is not established, to transmit a signal to request communication to the second external apparatus.

13. The first portable terminal as claimed in claim 8, wherein the at least one processor is further configured to control the transceiver, when the external apparatus corresponding to the selected one icon is a television, to obtain information regarding a currently-displayed channel from the television.

14. The first portable terminal as claimed in claim 8, wherein the at least one processor is further configured to, while chatting is performed with users of a plurality of other portable terminals, when the first portable terminal does not control a third external apparatus which is controllable by more than a predetermined number of portable terminals from among the plurality of other portable terminals, recommend a service regarding the third external apparatus.

15. A method for controlling an external apparatus by a first portable terminal, the method comprising:
receiving, from a server when an application to perform chatting with a user of a second portable terminal is executed, a list of external apparatuses controllable by the second portable terminal;
identifying, from the list of external apparatuses, an external apparatus controllable by both the first portable terminal and the second portable terminal;
displaying, by the first portable terminal, when the application to perform chatting with the user of the second portable terminal is executed, a chatting screen including a chatting area, a text input area, and at least one icon representing the identified external apparatus;
displaying, by the first portable terminal, when information regarding a second external apparatus is received from the second portable terminal, an icon representing the second external apparatus in the chatting area of the chatting screen;
transmitting, by the first portable terminal, when the icon representing the second external apparatus is selected in the chatting area of the chatting screen, the information regarding the second external apparatus and a control command to the second external apparatus corresponding to the selected icon; and controlling the second external apparatus corresponding to the selected icon in accordance with the control command.

16. A first portable terminal comprising:

a display;

an input device configured to receive a user command;

transceiver configured to perform communication with outside; and at least one processor configured to:

receive, from a server when an application to perform chatting with a user of a second portable terminal is executed, a list of external apparatuses controllable by the second portable terminal;

identify, from the list of external apparatuses, an external apparatus controllable by both the first portable terminal and the second portable terminal;

control the display of the first portable terminal, when the application to perform chatting with the user of the second portable terminal is executed, to display a chatting screen including a chatting area, a text input area, and at least one icon representing the identified external apparatus, control the display of the first portable terminal, when information regarding a second external apparatus is received from the second portable terminal, to display an icon representing the second external apparatus in the chatting area of the chatting screen, control the at least one processor, when the icon representing the second external apparatus is selected in the chatting area of the chatting screen through the input device, to transmit the information regarding the second external apparatus and a control command to the second external apparatus corresponding to the selected icon, and control the external apparatus corresponding to the selected icon in accordance with the control command.

17. A non-transitory computer-readable storage medium storing instructions that, when executed, cause at least one processor to perform the method of claim 1.

* * * * *